(12) United States Patent
Palmlöf et al.

(10) Patent No.: US 9,017,784 B2
(45) Date of Patent: Apr. 28, 2015

(54) PIPE HAVING IMPROVED HIGH TEMPERATURE RESISTANCE

(75) Inventors: Magnus Palmlöf, Västra Frölunda (SE); Solveig Johansson, Stenungsund (SE); Markku Vähteri, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 695 days.

(21) Appl. No.: 12/517,107

(22) PCT Filed: Nov. 21, 2007

(86) PCT No.: PCT/EP2007/010093
§ 371 (c)(1), (2), (4) Date: Jun. 30, 2009

(87) PCT Pub. No.: WO2008/064810
PCT Pub. Date: Jun. 5, 2008

(65) Prior Publication Data
US 2010/0055366 A1    Mar. 4, 2010

(30) Foreign Application Priority Data

Dec. 1, 2006    (EP) .................................... 06024951

(51) Int. Cl.
| | | |
|---|---|---|
| B29C 47/00 | (2006.01) | |
| C08L 23/06 | (2006.01) | |
| C08L 23/08 | (2006.01) | |

(52) U.S. Cl.
CPC .............. *C08L 23/06* (2013.01); *Y10T 428/139* (2015.01); *C08L 23/08* (2013.01); *C08L 23/0815* (2013.01); *C08L 2205/02* (2013.01); *C08L 2314/06* (2013.01)

(58) Field of Classification Search
CPC . C08L 2666/06; C08L 23/06; C08L 23/0815; C08L 2205/02; C08L 2314/06; C08L 23/08; C08L 2308/00
USPC ................................ 428/36.9, 35.7
See application file for complete search history.

(56) References Cited

U.S. PATENT DOCUMENTS

| | | | |
|---|---|---|---|
| 6,103,807 A * | 8/2000 | Carter et al. .................. | 524/481 |
| 2002/0156214 A1 | 10/2002 | Laurent | |
| 2004/0266966 A1 * | 12/2004 | Schramm et al. ............. | 526/352 |

FOREIGN PATENT DOCUMENTS

| | | |
|---|---|---|
| EP | 0423962 | 4/1991 |
| EP | 1146078 | 10/2001 |
| EP | 1574549 | 9/2005 |
| EP | 1764389 | 3/2007 |
| WO | 0001765 | 1/2000 |
| WO | 0037556 | 6/2000 |

OTHER PUBLICATIONS

International Search Report Jan. 23, 2008 for PCT/EP2007/010093.
International Preliminary Report on Patentability dated Feb. 9, 2009 for PCT/EP2007/010093.
Written Opinion for PCT/EP2007/010093.
Reding. "The Stiffness Modulus of Polyethylene as a Function of Temperature and Structure," Journal of Polymer Science vol. XXXII, p. 487-502 (1958).
Peacock. "Handbook of Polyethylene—Structures, Properties, and Applications." Marcel Dekker, Inc. (2000).

* cited by examiner

*Primary Examiner* — James Yager
(74) *Attorney, Agent, or Firm* — Milbank, Tweed, Hadley & McCloy LLP

(57) ABSTRACT

The present invention relates to a pipe made of a polyethylene composition comprising a polyethylene base resin, which comprises c. an ethylene copolymer as fraction (A), and d. an ethylene homo- or copolymer as fraction (B), with fraction (A) having a lower molecular weight than fraction (B), wherein the polyethylene base resin is obtainable in a polymerization process in which a single-site catalyst (SSC) is used in the polymerization of at least one of fractions (A) and (B), the base resin having (i) a density of below 940 kg/m$^3$, and (ii) a MFR$_5$ at 190° C./5.00 kg of at least 0.20 g/10 min, and the polyethylene composition having a time to failure of at least 250 h measured according to ISO 1167 at 95° C. and 4.3 MPa.

10 Claims, No Drawings

PIPE HAVING IMPROVED HIGH TEMPERATURE RESISTANCE

This application is based on International Application PCT/EP2007/010093 filed Nov. 21, 2007, which claims priority to European Patent Application No. 06024951.3, filed on Dec. 1, 2006, the disclosures of which are incorporated by reference herein in their entireties.

The present invention relates to a pipe with improved high temperature resistance made of a polyethylene composition comprising a polyethylene resin produced by a polymerisation process in the presence of a single-site catalyst (SSC), and to a process for the production of such a pipe.

Pipes, in particular pressure pipes, are used in various applications like the transport of drinking water, sewage, different industrial applications, gas and more.

Based on the polymer strength, polyethylene pipes for pressurised systems can be classified in different categories, such as PE63, PE80 or PE100. The higher the number, the longer the service life under high pressure.

However, polyethylene has a limited pressure resistance at elevated temperature. Especially, it is difficult to combine good pressure resistance at higher temperatures with a high flexibility of the piping materials.

The classic tool to improve the pressure resistance of a pipe at elevated temperature is to cross-link the material. However, the inferior purity of cross-linked resins can be an obstacle for their use in pipes which are in contact with drinking water and/or food. Furthermore, the recycling of cross-linked material is difficult. Thus, thermoplastic solutions would be preferred if the technical performance, such as pressure resistance at elevated temperatures, can be sufficiently improved. Many attempts to design such materials have been made.

Presently, the best polyethylene pressure pipes are prepared in a multistage process with Ziegler-Natta catalysts. The densities of such polyethylene resins are high in order to reach a high pressure resistance. However, high density gives a high stiffness, which is a drawback e.g. when installing the pipes.

There has also been an intensive research on polyolefin resins produced with metallocene or "single-site" catalysts, but still the introduction of such resin into the market is low. The main areas where single site resins have been introduced are film or extrusion coating, as disclosed e.g. in WO 03/066699. The films disclosed in this document have excellent mechanical properties and outstanding sealability.

However, it is known that the catalytic activity of single-site catalysts is moderate and the highest activity is reached in the medium to low density regions.

Furthermore, pressure pipe resins prepared by single-site catalysts of the state of the art, as described e.g. in WO 02/34829, have traditionally a density higher than 940 kg/m³. The consequence is that the flexibility of the pipes is rather low.

Still further, for the production of pressure pipes it is necessary that the polyethylene compositions used have a suitable melt flow rate and molecular weight distribution, in order to ensure a good processability of the composition during the extrusion process.

Hence, the object of the present invention is to provide a pipe having improved pressure resistance at elevated temperature by simultaneously improving the flexibility of the pipe.

It has now surprisingly been found that such a pipe can be produced by using a polyethylene composition comprising a base resin which has been produced using a single site catalyst, which has a density below 940 kg/m³ and a $MFR_5$ of at least 0.2 g/10 min.

Therefore, the present invention provides a pipe made of a polyethylene composition comprising a polyethylene base resin, which comprises
 a. an ethylene copolymer as fraction (A), and
 b. an ethylene homo- or copolymer as fraction (B),
with fraction (A) having a lower molecular weight than fraction (B), wherein the polyethylene base resin is obtainable in a polymerisation process in which a single-site catalyst (SSC) is used in the polymerisation of at least one of fractions (A) and (B), the base resin having
 (i) a density of below 940 kg/m³,
 and
 (ii) a $MFR_5$ at 190° C./5.00 kg of at least 0.20 g/10 min, and the polyethylene composition having a time to failure of at least 250 h measured according to ISO 1167 at 95° C. and 4.3 MPa.

As demonstrated below, the invention enables preparation of more flexible pipes still meeting the requirements for high pressure resistance at elevated temperatures.

Hence, for example, the enhanced flexibility of the pipes of the invention allow for an easier bending thereof and thus an easier coiling into a roll. This offers the advantage that installing the pipes is much simplified.

The term "base resin" denotes the entirety of polymeric components in the polyethylene composition of the pipe according to the invention, usually making up at least 90 wt % of the total composition. Preferably, the base resin is consisting of fractions (A) and (B), optionally further comprising a prepolymer fraction in an amount of up to 20 wt %, preferably up to 10 wt %, more preferably up to 5 wt % of the total base resin.

The density of the base resin lies in the medium range, i.e. below 940 kg/m³, preferably below 939 kg/m³, more preferably in the range of 910 to below 940 kg/m³, even more preferably in the range of 915 to below 940 kg/m³, and most preferably in the range of 920 to below 939 kg/m³, measured according to ISO 1183.

Despite a 5 to 10 kg/m³ units lower density of the base resin compared to conventional resins, the pipes of the invention fulfill high temperature requirements.

The melt flow rate (MFR) and the flow rate ratio (FRR) are important properties of the polyethylene base resin, because MFR and FRR are indications of the flowability and thus processability of the polymer. The higher the melt flow rate, the lower the viscosity of the polymer.

In the present invention the polyethylene base resin should have an $MFR_5$ of at least 0.20 g/10 min, preferably of at least 0.5 g/10 min, and most preferably of at least 1.3 g/10 min. The $MFR_5$ of the polyethylene base resin is usually below 7.0 g/10 min, more preferably is 3.5 g/10 min or lower, and most preferably is 1.5 g/10 min or lower.

Furthermore, it is preferred that the polyethylene base resin has an $MFR_2$ from 0.06 to 10 g/10 min, more preferred from 0.1 to 5.0 g/10 min, still more preferred from 0.1 to 1.0 g/10 min, and most preferred from 0.1 to 0.5 g/10 min.

Moreover, for pipe applications a good processability of the polyethylene composition is important. High molecular weight is needed for meeting the requirement of good pressure resistance at elevated temperatures and low creep, however, processing of such high molecular weight resins is more difficult. Improved processability is reached by the multimodal design of the base resin. This means at least one lower molecular weight fraction (A) giving easier processability and one fraction with a higher molecular weight (B) contributing to mechanical strength, are present in the composition used for pipes of the invention.

Usually, a polyethylene composition comprising at least two polyethylene fractions, which have been produced under different polymerisation conditions resulting in different (weight average) molecular weights for the fractions, is referred to a "multimodal". The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or will at least be distinctly broadened in comparison with the curves for the individual fractions.

For example, if a polymer is produced in a sequential multistage process, utilising reactors coupled in series and using different conditions in each reactor, the polymer fractions produced in different reactors will each have their own molecular weight distribution and weight average molecular weight. When the molecular weight distribution curve of such a polymer is recorded, the individual curves from these fractions are superimposed into the molecular weight distribution curve for total resulting polymer product, usually yielding a curve with two or more distinct maxima.

The polyethylene base resin of the present invention is a multimodal-, or more preferred a bimodal, polyethylene base resin, comprising fractions (A) and (B) as defined above, wherein fraction (A) has a lower molecular weight than fraction (B).

In the preferred embodiment in which the base resins consists of fractions (A) and (B), optionally a prepolymer fraction in an amount as defined above may be present.

The term molecular weight where used herein denotes the weight average molecular weight $M_w$.

The polyethylene base resin of the present invention preferably has a molecular weight distribution (MWD) of 5 to 25, more preferably of 5 to 20, and most preferably of 5 to 15.

It is preferred that ethylene copolymer (A) has a density of below 945 kg/m³, more preferably below 940 kg/m³. The preferred density range for ethylene copolymer (A) is from 920 to below 945 kg/m³, more preferred from 925 to below 940 kg/m³.

Furthermore, in the present invention fraction (A) is an ethylene copolymer and fraction (B) can be an ethylene homo- or copolymer. However, it is preferred that fraction (B) is an ethylene copolymer.

The used comonomers of both fractions may be equal or different.

As comonomers various alpha-olefins with $C_4$ to $C_{20}$ carbon atoms may be used, but the comonomers are preferably a $C_4$-$C_{20}$ alkene selected from the group of 1-butene, 1-pentene, 4-methyl-1-pentene, 1-hexene, 1-heptene, 1-octene, 1-decene and 1-eicosene. In particular preferred embodiment, the comonomer is 1-butene and/or 1-hexene.

The polyethylene base resin of the present invention may also comprise a terpolymer, which means that at least on of the fractions (A) and (B) consists of ethylene and two different comonomer units.

Preferably, fraction (B) is an ethylene copolymer, and the comonomer used is an alpha-olefin with 4, more preferably 6, or more carbon atoms, more preferably is 1-hexene or 1-octene.

The amount of the comonomer used in fraction (A) preferably is between 0.1 to 3.0 mol-%, more preferably 0.2 to 2.0 mol-%, even more preferably 0.5 to 1.5 mol-%.

The amount of the comonomer used in fraction (B) preferably is between 0.1 to 2.0 mol-%, more preferably 0.1 to 1.5 mol-%, even more preferably 0.2 to 1.0 mol-%.

Moreover, the melt flow rate $MFR_2$ (190° C./2.16 kg) of fraction (A) preferably is between 10 to 300 g/10 min, more preferably between 10 to 200 g/10 min, and most preferably between 50 to 140 g/10 min.

It is previously known that in order to produce multimodal, in particular bimodal, olefin polymers, such as the polyethylene base resin of the present invention, two or more reactors or zones connected in series as described in EP 517 868, which is hereby incorporated by way of reference in its entirety, can be used.

According to the present invention, the main polymerisation stages are preferably carried out as a combination of slurry polymerisation/gas-phase polymerisation. The slurry polymerisation is preferably performed in a so-called loop reactor.

Optionally and advantageously, the main polymerisation stages may be preceded by a pre-polymerisation, in which case a prepolymer in the amount as described above, most preferably in an amount of 1 to 5% by weight of the total amount of polymers is produced. The pre-polymer may be an ethylene homo- or copolymer.

If a pre-polymerisation takes place, in this case all of the catalyst is preferably charged into the first prepolymerisation reactor and the pre-polymerisation is performed as slurry polymerisation. Such a polymerisation leads to less fine particles being produced in the following reactors and to a more homogeneous product being obtained in the end. Generally, this technique results in a multimodal polymer mixture through polymerisation with the aid of a catalyst, in the present invention with the aid of a single site catalyst.

The single-site catalyst used in the examples of the present invention has been disclosed in EP 1 462 464, example 5, catalyst 3.

In the process of the invention for producing the base resin of the polymer composition of the invention, at least fraction (A) or fraction (B) are produced in a polymerisation reaction in the presence of a single-site catalyst. For example, fraction (A), or alternatively (B), may be produced in the presence of a single-site catalyst and fraction (B), or alternatively (A), may be produced in the presence of a Ziegler-Natta catalyst.

It is, however, preferred that both fractions (A) and (B) are prepared in the presence of a single-site catalyst.

Furthermore, it is preferred that fraction (A) and fraction (B) are polymerised in the presence of the same single-site catalyst.

In the production of a polyethylene base resin of the present invention it is preferred that fraction (A) is produced in a loop reactor under certain conditions with respect to hydrogen, monomer and comonomer concentration, temperature, pressure, and so forth.

Furthermore, it is preferred that fraction (B) is produced in a gas-phase reactor.

Still further, preferably, after the polymerisation fraction (A) including the catalyst is transferred to the reactor, preferably a gas-phase reactor, where fraction (B) is produced under different conditions.

The resulting end product consists of an intimate mixture of the polymers from the two main reactors, the different molecular-weight-distribution curves of these polymers together forming a molecular-weight-distribution curve having a broad maximum or two maxima, i.e. the end product is a bimodal polymer mixture.

Owing to the flexibility with respect to reaction conditions thus obtained, it is most preferred that the polymerization is carried out in a pre-polymerization reactor/a loop reactor/a gas-phase reactor. Preferably, the polymerization conditions in the preferred three-step method are chosen so that fraction (A) is produced in one step, preferably the second reactor, whereas fraction (B) is produced in another step, preferably the third reactor. The order of these steps may, however, be reversed.

In the present invention it is preferred that the pre-polymerisation operates at a temperature between 40 to 70° C., more preferred between 50 to 65° C. and preferably at a pressure of 50 to 70 bar, more preferably of 55 to 65 bar.

In the second reactor the polymerisation temperature is preferably between 60 to 100° C., more preferably between 70 to 90° C., and preferably at a pressure of 40 to 70 bar, more preferably of 50 to 60 bar.

In the third reactor the temperature is preferably between 60 to 105° C., more preferably between 70 and 90° C. and preferably at a pressure of 10 to 40 bar, more preferably of 15 to 20 bar.

The weight ratio between both fractions (A) and (B) produced in the second and third reactor is preferably from 60:40 to 40:60, more preferably from 55:45 to 45:55.

The polyethylene composition the pipe of the invention is made of may also comprise additives like process aids, antioxidants, pigments, UV-stabilizers and the like. Usually, the amount at those additives is 10 wt % or lower, based on the total composition.

The pipe of the present invention may be prepared in any conventional manner, preferably by extrusion of the polyolefin composition in an extruder. This is a technique well known to the person skilled in the art.

The pipe of the present invention shows good stress resistance as well as a high flexibility.

The shear thinning index (SHI) is the ratio of the viscosity of the polyethylene base resin at different shear stresses and may serve as a measure of the broadness of the molecular weight distribution. In the present invention, the shear stresses at 2.7 kPa and 210 kPa as well as 5 kPa and 300 kPa are used for the determination of SHI of the polyethylene base resin. The definition and measurement conditions are described in detail on page 8, line 29 to page 11, line 25 of WO 00/22040.

The polyethylene base resin has preferably an $SHI_{(2.7/210)}$ of below 20, more preferably of below 15, and most preferably of below 10. It is preferred the range of $SHI_{(2.7/210)}$ is from 1 to below 20.

It is also preferred that the $SHI_{(5/300)}$ is below 35, more preferred below 30 and most preferred below 25. The preferred range of the $SHI_{(5/300)}$ is between 5 to below 35.

Additionally, the viscosity at shear stress of 0.05 kPa ($eta_{0.05}$) of the polyethylene base resin is preferably at least 15,000 Pa s, more preferably at least 18,000 Pa s, and most preferably at least 20,000 Pa s.

Furthermore, the viscosity at shear stress of 0.05 kPa ($eta_{0.05}$) of the polyethylene base resin is preferably less than 80,000 Pa s.

The Charpy impact test at low temperature assesses impact toughness and therefore provides a way to evaluate resistance to rapid crack propagation (RCP).

In the preferred embodiment of the present invention the polyethylene composition of the pipe has a Charpy impact strength at 0° C. of at least 8 $kJ/m^2$, most preferably of at least 10 $kJ/m^2$, measured according to ISO 179.

The rapid crack propagation resistance of the polyethylene composition according to the present invention is determined by a method called S4 (Small Scale Steady State), which has been developed at Imperial College, London, and is described in ISO 13477:1977 (E). The pipes of the present invention preferably reach a critical temperature, i.e. RCP-S4 value, of +2° C. or lower, more preferably of +1° C. or lower.

The slow crack propagation resistance is determined according to ISO 13479:1997 in terms of the number of hours the notched pipe withstands a certain pressure at a certain temperature before failure.

Additionally, the time to failure of the polyethylene composition at 95° C. and 4.3 MPa according to ISO 1167 preferably is at least 250 h, more preferably at least 300 h, most preferably at least 350 h.

The flexural modulus of the polyethylene composition is preferably below 700 MPa, more preferably below 650 MPa, and most preferably below 600 MPa, measured according to ISO 178. It is preferred that the flexural modulus of the polyethylene composition is 300 MPa or higher, more preferably is 400 MPa or higher.

The modulus of elasticity of the pipe of the present invention has been determined according to ISO 527. The polymer composition according to the present invention has preferably a modulus of elasticity from 400 to 900 MPa, more preferably from 425 to 850 MPa and most preferably from 450 to 800 MPa.

METHODS AND EXAMPLES

Melt Flow Rate (MFR)

The MFR is determined according to ISO 1133 and is indicated in g/10 min. For polyethylene resins, a temperature of 190° C. is applied. The MFR is determined at different loadings such as 2.16 kg ($MFR_2$; ISO 1133), 5 kg ($MFR_5$; ISO 1133) or 21.6 kg $MFR_{21}$ (ISO 1133). The flow rate ratio, FRR is the ratio between $MFR_{weight1}$ and $MFR_{weight2}$, i.e. $FRR_{21/5}$ means the ratio between $MFR_{21}$ and $MFR_5$.

Molecular Weight

The weight average molecular weight $M_w$ and the molecular weight distribution (MWD=$M_w/M_n$, wherein $M_n$ is the number average molecular weight and $M_w$ is the weight average molecular weight) is measured by based on ISO 1014-4: 2003. A Waters 150CV plus instrument was used with column 0.3×HT&E styragel from Waters (divinylbenzene) and trichlorobenzene (TCB) as solvent at 140° C. The column set was calibrated using universal calibration with narrow MWD PS standards (the Mark Howings constant K: $9.54*10^{-5}$ and a: 0.725 for PS, and K: $3.92*10^{-4}$ and a: 0.725 for PE). The ratio of $M_w$ and $M_n$ is a measure of the broadness of the distribution, since each is influenced by opposite end of the "population".

Rapid Crack Propagation (S4)

The rapid crack propagation (RCP) resistance of a pipe is determined according to ISO 13477 (E). According to the RCP-S4 method a pipe is tested which has an axial length not below 7 pipe diameters. The outer diameter of the pipe is about 110 mm or greater and its wall thickness about 10 mm or greater. When determining the RCP properties of a pipe in connection with the present invention the outer diameter and the wall thickness have been selected to be 110 mm and 10 mm respectively. While the exterior of the pipe is at ambient pressure (atmospheric pressure), the pipe is pressurized internally and the internal pressure in the pipe is kept constant at a pressure of 0.5 MPa positive pressure. The pipe and the equipment surrounding it are thermostated to a predetermined temperature. A number of discs have been mounted on a shaft inside the pipe to prevent decompression during the test. A knife projectile is shot, with well-defined forms, towards the pipe close to its end in the so-called initiating zone in order to start a rapidly running axial crack. The initiating zone is provided with an abutment for avoiding unnecessary deformation to the pipe. The test equipment is adjusted in such a manner that crack initiation takes place in the material involved and a number of tests are effected at varying temperatures. The axial crack length in the measuring zone, having a total length of 4.5 diameters, is measured for each test and is plotted against the set test temperature. If the crack length exceeds 4 diameters the crack is assessed to propagate. If the pipe passes the test at a given temperature, the temperature is lowered successively until a temperature ($T_{critical}$) is reached, at which the pipe no longer passes the test.

Pressure Test on Un-Notched Pipes

The pressure test on un-notched 32 mm pipes is carried out according to ISO 1167 3 at 4.3 MPa and 95° C. The time to failure is determined in hours.

Pressure Test on Notched Pipes

The pressure test on notched 110 mm pipes is carried out according to ISO 13479.

Charpy Notch Impact Test

The impact strength is determined as Charpy Impact Strength according to ISO 179-1 non-instrumented or ISO 179-2 instrumented.

Flexural Modulus

The flexural modulus is determined according to ISO 178 at a constant speed of 2 min/min.

E-Modulus

The modulus of elasticity is determined according to ISO 527-2 (test specimen 1B), at a constant speed of 1 mm/min.

Rheological Parameters

Rheological parameters such as Shear Thinning Index SHI and viscosity are determined by using a rheometer, preferably a Physica MCR 300 Rheometer from Anton Paar. The definition and measurement conditions are described in detail on page 8, line 29 to page 11, line 25 of WO 00/22040.

EXAMPLES

Example 1

Into a 50 dm³ loop reactor 32 kg/h propane and 8.3 g/h hydrogen were added. The operating temperature was 60° C. and operating pressure 61 bar.

The slurry was taken out of the reactor and transferred into a 500 dm³ loop reactor. The reactor was operated at 85° C. and 58 bar pressure. The single site catalyst prepared as disclosed in EP 1 462 464, Example 5, catalyst 3 was continuously fed at a rate of 29 g/min into the loop reactor. Additional ethylene, 1-butene, propane diluent and hydrogen were continuously introduced into the reactor so that the rate of polymer production was 35 kg/h and the MFR₂ of the polymer was 110 g/10 min and the density of polymer was 939 kg/m³.

The slurry was continuously withdrawn from the reactor to a flash stage where hydrocarbons were removed from the polymer. The polymer was then transferred into a gas phase reactor where the polymerisation was continued. The reactor was operated at 80° C. temperature and 20 bar pressure. Ethylene, hydrogen and 1-hexene were fed into the reactor to obtain such conditions that the rate of polymer production was 34 kg/h, MFR₅ of the polymer was 1.4 g/10 min, MFR₂ of the polymer was 0.45 g/10 min and the density 936 kg/m³. The productivity of the catalyst was 2.4 kg/g catalyst.

The ratio between polymer amounts produced in the slurry (reactor 2) and gas phase (reactor 3) reactors was 51:49.

The polymer was then compounded in with 1500 ppm Calcium stearate and 3000 ppm B225. The properties of the compounded resin are given in Table 1, where also the reaction conditions for the production of the base resin are shown.

The compounded material was extruded into pipes having an external diameter of about 110 mm and thickness of about 10 mm and 32 mm and a thickness of 3 mm respectively. The pressure test result of the pipe is given in Table 1.

Comparative Example 1

A pipe resin was produced by means of a three-step process in a pre-polymerisation loop-reactor followed by first a loop-reactor and then a gas phase-reactor, as described in Example 1. The split was 2:38:60. No comonomer was used in the prepolymerisation reactor, while 1-butene was used as comonomer in the production of the low and of the high molecular weight fraction produced in the loop and gas-phase reactor, respectively, in the amounts as indicated in Table 1 such that the 1-butene comonomer content of the total resulting polymer was 2.9% by weight. A Ziegler-Natta type catalyst as disclosed in EP 688 794 was used. The properties of the resin are listed in Table 1.

The base resin produced was compounded in the same ways as in Example 1 and the compounded material was then extruded into pipes having an external diameter of about 110 mm and thickness of about 10 mm and a diameter of 32 mm and a thickness of 3 mm respectively. The result of the pressure testing is also given in Table 1.

TABLE 1

|  | units | Example 1 | Comparative Example 1 |
|---|---|---|---|
| PREPOLYMERISATION REACTOR | | | |
| Temperature | ° C. | 60 | 70 |
| Pressure | bar | 61 | 64.2 |
| Split | wt-% | 0 | 2 |
| LOOP REACTOR | | | |
| Temperature | ° C. | 85 | 85 |
| Pressure | bar | 58 | 64 |
| $C_2$ concentration | mol % | 5.7 | 5.8 |
| $H_2/C_2$ ratio | mol/kmol | 0.46 | 293 |
| $C_4/C_2$ ratio | mol/kmol | 92 | 163 |
| Split | wt-% | 51 | 38 |
| MFR₂ | g/(10 min) | 110 | 300 |
| Density | kg/m³ | 939 | 964 |
| Comonomer | | Butene-1 | Butene-1 |
| GAS PHASE REACTOR | | | |
| Temperature | ° C. | 80 | 85 |
| Pressure | bar | 20 | 19.5 |
| $H_2/C_2$ ratio | mol/kmol | 0 | 20 |
| $C_4/C_2$ ratio | mol/kmol | 0 | 138 |
| $C_6/C_2$ ratio | mol/kmol | 4 | 0 |
| Split | wt-% | 49 | 60 |
| Comonomer | | Hexene-1 | Butene-1 |
| Density base resin | kg/m³ | 936 | 942.2 |
| COMPOUNDING | | JSW CIM90P EXTRUDER | JSWCIM460P |
| Feed | kg/hr | 217 | |
| SEI | kWh/t | 277 | 235 |
| Melt temperature | ° C. | 222 | 285 |
| PROPERTIES OF COMPOUNDED RESIN | | | |
| Hexene-1 content | wt-% | 1.3 | 0 |
| Butene-1 content | wt-% | 1.6 | 2.2 |
| MFR₂ | g/(10 min) | 0.45 | |
| MFR₅ | g/(10 min) | 1.4 | 0.45 |
| MFR₂₁ | g/(10 min) | | 10 |
| $M_w$ | g/mol | 157,000 | 240,000 |
| $M_n$ | g/mol | 17,200 | 8,600 |
| MWD | | 9.1 | 28 |
| Density compound | kg/m³ | 937.2 | 942.5 |

TABLE 1-continued

| | units | Example 1 | Comparative Example 1 |
|---|---|---|---|
| $SHI_{(2.7/210)}$ | | 8.6 | 21.8 |
| $SHI_{(5/300)}$ | | 15.2 | 36.5 |
| $Eta_{0.05}$ | Pa s | 23450 | 82250 |
| E-modulus | MPa | 640 | 868 |
| Flexural Modulus | MPa | 596 | 730 |
| Impact strength at 0° C. | kJ/m² | 10 | 16 |
| Impact strength at −20° C. | kJ/m² | 5.9 | |
| Pressure test on un-notched 32 mm pipes | | | |
| 4.3 MPa at 95° C. | h | 406 | <21 |
| RCP-resistance, $T_{critical}$ | ° C. | +1 | |

The invention claimed is:

1. A pipe made of polyethylene composition comprising a polyethylene base resin, which comprises:
   a. a copolymer of ethylene and $C_4$ to $C_{20}$ alpha-olefin comonomers as fraction (A), wherein ethylene copolymer (A) has a density of from 925 to below 940 kg/m³, and
   b. an ethylene copolymer and an alpha-olefin comonomer with 4 or more carbon atoms as fraction (B);
   wherein the comonomer content of fraction (A) is between 0.1 and 3.0 mol % and the comonomer content of fraction (B) is between 0.1 and 2.0 mol %;
   with fraction (A) having a lower molecular weight than fraction (B), wherein the polyethylene base resin is obtained by a polymerization process in which fraction (A) and fraction (B) are polymerised in the presence of the same single-site catalyst (SSC), the base resin having:
   (i) a density of below 940 kg/m³, and
   (ii) a $MFR_5$ at 190° C./5.00 kg of at least 0.20 g/10 min;
   wherein the polyethylene composition has a time to failure of at least 250 h measured according to ISO 1167 at 95° C. and 4.3 MPa;
   wherein the polyethylene composition has a flexural modulus below 700 MPa measured according to ISO 178; and
   wherein the polyethylene base resin has an $SHI_{(2.7/210)}$ of below 20.

2. The pipe according to claim 1, wherein fraction (A) has a melt flow rate $MFR_2$ of 10 to 300 g/10 min.

3. The pipe according to claim 1, wherein in the base polyethylene resin the weight ratio between fraction (A) and fraction (B) is between 60:40 to 40:60.

4. The pipe according to claim 1, wherein the molecular weight distribution (MWD) of the polyethylene base resin is from 5 to 25.

5. The pipe according to claim 1, wherein the $SHI_{(5/300)}$ is below 35.

6. The pipe according to claim 1, wherein the viscosity of the polyethylene base resin at a shear rate of 0.05 kPa ($eta_{0.05}$) is at least 15,000 kPa.

7. The pipe according to claim 1, wherein the polyethylene composition has a Charpy impact strength at 0° C. of at least 8 kJ/m², measured according to ISO 179.

8. The pipe according to claim 1, wherein the polyethylene composition has an RCP-S4 value of +2° C. or lower, measured according to ISO 13477.

9. The pipe according to claim 1, wherein the polyethylene composition has a modulus of elasticity from 400 to 900 MPa according to ISO 527.

10. A process for the manufacturing of a pipe, wherein a polyethylene composition comprising a polyethylene base resin, which comprises:
   a. a copolymer of ethylene and $C_4$ to $C_{20}$ alpha-olefin comonomers as fraction (A), wherein ethylene copolymer (A) has a density of from 925 to below 940 kg/m³, and
   b. an ethylene copolymer and an alpha-olefin comonomer with 4 or more carbon atoms as fraction (B); wherein the comonomer content of fraction (A) is between 0.1 and 3.0 mol % and the comonomer content of fraction (B) is between 0.1 and 2.0 mol %;
   with fraction (A) having a lower molecular weight than fraction (B), wherein the polyethylene base resin is obtained by a polymerization process in which fraction (A) and fraction (B) are polymerized in the presence of the same single-site catalyst (SSC), the base resin having:
   (i) a density of below 940 kg/m³, and
   (ii) a $MFR_5$ at 190° C./5.00 kg of at least 0.20 g/10 min;
   the polyethylene composition having a time to failure of at least 250 h measured according to ISO 1167 at 95° C. and 4.3 MPa;
   wherein the polyethylene composition has a modulus of elasticity below 700 MPa measured according to ISO 178; and
   the $SHI_{(2.7/210)}$ of the polyethylene base resin is below 20;
is formed into a pipe.

* * * * *